United States Patent [19]
Davis, Jr. et al.

[11] Patent Number: 5,516,041
[45] Date of Patent: May 14, 1996

[54] METHOD AND CONTROL SYSTEM FOR CONTROLLING AN AUTOMOTIVE HVAC SYSTEM TO PREVENT FOGGING

[75] Inventors: Leighton I. Davis, Jr.; Robert W. Matteson, both of Ann Arbor; Gerhard A. Dage, Franklin, all of Mich.

[73] Assignee: Ford Motor Company, Dearborn, Mich.

[21] Appl. No.: 363,085

[22] Filed: Dec. 23, 1994

Related U.S. Application Data

[63] Continuation-in-part of Ser. No. 83,757, Jun. 30, 1993, Ser. No. 83,587, Jun. 30, 1993, Pat. No. 5,427,313, Ser. No. 83,589, Jun. 30, 1993, and Ser. No. 83,756, Jun. 30, 1993.

[51] Int. Cl.$^6$ ................................................ G05D 21/00
[52] U.S. Cl. .................... 236/49.3; 236/91 C; 236/44 C; 62/176.6; 62/180; 165/43; 454/75
[58] Field of Search ................................ 236/49.3, 44 R, 236/44 A, 44 C, 91 R, 91 C; 454/75, 901, 256, 258; 62/176.1, 176.6, 180, 229, 244; 165/17, 21, 42, 43

[56] References Cited

U.S. PATENT DOCUMENTS

| | | | |
|---|---|---|---|
| 4,340,112 | 7/1982 | Sutoh et al. | 165/16 |
| 4,350,286 | 9/1982 | Sutoh et al. | 236/44 A |
| 4,424,933 | 1/1984 | Sutoh et al. | 236/44 A |
| 4,448,035 | 5/1984 | Moriyama et al. | 62/176.6 |
| 4,482,007 | 11/1984 | Yoshimi et al. | 165/21 |
| 4,487,029 | 12/1984 | Hidaka et al. | 62/133 |
| 4,730,662 | 3/1988 | Kobayashi | 165/25 |
| 4,783,970 | 11/1988 | Takahashi | 62/176.3 |
| 4,848,444 | 7/1989 | Heinle et al. | 165/21 |
| 4,852,363 | 8/1989 | Kampf et al. | 62/176.6 |
| 4,895,000 | 1/1990 | Takahashi | 62/176.3 |
| 4,896,589 | 1/1990 | Takahashi | 98/2.01 |
| 4,910,967 | 3/1990 | Takahashi | 62/176.1 |
| 4,914,924 | 4/1990 | Takahashi | 236/91 CX |
| 4,920,755 | 5/1990 | Tadahiro | 62/171 |
| 5,014,519 | 5/1991 | Noji et al. | 62/176.3 |
| 5,261,596 | 11/1993 | Tachibana et al. | 236/49.3 |
| 5,345,776 | 9/1994 | Komazaki et al. | 62/176.6 X |
| 5,426,951 | 6/1995 | Yamashita et al. | 236/44 CX |

FOREIGN PATENT DOCUMENTS

| | | |
|---|---|---|
| 57-191116 | 11/1982 | Japan . |
| 63-265721 | 11/1988 | Japan . |
| 63-269718 | 11/1988 | Japan . |

*Primary Examiner*—Harry B. Tanner
*Attorney, Agent, or Firm*—Raymond L. Coppiellie; Roger L. May

[57] ABSTRACT

Method and control system for controlling an automotive HVAC (heating, ventilation and air conditioning) system using fuzzy logic to prevent fogging. The control system responds to signals generated by various climate control sensors including a humidity sensor to produce a desired vehicle air temperature and air flow to detect and avoid incipient windshield/window fog conditions. Fuzzy logic calculations are performed based on fuzzy rules and membership functions to provide nonlinear compensation.

10 Claims, 6 Drawing Sheets

5,516,041

METHOD AND CONTROL SYSTEM FOR CONTROLLING AN AUTOMOTIVE HVAC SYSTEM TO PREVENT FOGGING

CROSS-RELATION TO RELATED APPLICATIONS

This application is a continuation-in-part of U.S. patent application Ser. No. 083,757 entitled "Method And Control System For Controlling An Automotive HVAC System To Prevent The Discharge Of Air Within A Predetermined Temperature Range"; U.S. Ser. No. 083,587 entitled "Method And System For Predicting Air Discharge Temperature In A Control System Which Controls An Automotive HVAC System", U.S. Pat. No. 5,427,313; U.S. Ser. No. 083,589 entitled "Method And System For Modifying A Linear Control Algorithm Which Controls An Automotive HVAC System"; and U.S. Ser. No. 083,756 entitled "Method And Control System For Controlling An Automotive HVAC System", all of which have the same inventive entity, are assigned to the same assignee and have the same filing date of Jun. 30, 1993.

This application is also related to U.S. patent applications entitled "Method And Control System For Economically Controlling An Automotive HVAC System" and "Method And Control System For Controlling An Automotive HVAC System For Increased Occupant Comfort", both of which have the same inventive entity, are assigned to the same assignee, and have the same filing date as the present application.

TECHNICAL FIELD

This invention relates to methods and control systems for controlling an automotive HVAC system and, in particular, to methods and systems for controlling an automotive HVAC system to prevent fogging.

BACKGROUND ART

A fundamental goal of automotive heating, ventilating, and air conditioning (HVAC) systems is to detect and avoid windshield/window fogging conditions.

In an attempt to measure and control the many variables that affect fogging, modern automotive HVAC systems have many sensors and control actuators. A typical system might have a temperature sensor inside the cabin, one measuring ambient temperature outside and others measuring various temperatures of the system internal workings. The occupant may have some input to the system via a set point or other adjustment. Additional sensors measuring sun heating load, humidity, etc. might be available to the system. The set of actuators might include a variable speed blower, some means for varying air temperature, ducting and doors to control the direction of air flow and the ratio of fresh to recirculated air.

It falls to the controller to sort out the range of possible conditions, determine what is needed to detect and avoid windshield/window fogging conditions and coordinate the control of the set of actuators available. This multiple input, multiple output control problem may not fall into any convenient category of traditional control theory. Such considerations such as occupant comfort and vehicle economy may also be considered. The response of the system as well as the relationship between system variables and desired performance, for prevention, may not be linear. Also, it is important to note that despite all the actuators and variables available for control, there may exist conditions under which fog prevention may not be achievable.

Due to practical considerations of size, energy consumption, cost and the wide conceivable range of conditions that automobiles are exposed to, the system plant may simply not be able to supply what is needed. All these considerations lead to a control problem that is far from what is usually encountered in traditional control theory.

FUZZY LOGIC APPROACH

Fuzzy logic is a methodology for handling knowledge that contains some uncertainty or vagueness. The foundations of fuzzy logic were set forth in the 1960s by L. A. Zadeh in his paper entitled "Fuzzy Sets", INFORM. CONTR., 8 pp. 338–353, 1965.

In current engineering application, fuzzy logic is most often found in control problems in the form of a particular procedure, called "max-min" fuzzy inference as described by Ebrahim Mamdani in his paper entitled "Application of Fuzzy Logic to Approximate Reasoning Using Linguistic Synthesis", IEEE TRANSACTIONS ON COMPUTERS, (1977) C-26, No. 12, pp. 1182–1191. This procedure incorporates approximate knowledge of appropriate control response for different circumstances into sets of rules for calculating a particular control action. The rules are expressed in terms of "IF (situation holds), THEN (take consequent control action)". The degree to which a particular consequent action is taken depends on the degree to which its corresponding conditions hold. The linguistic expression of a situation or consequent control action is translated into a definite calculation via specified membership functions. A membership function quantifies what is meant by a phrase such as "The temperature is high" by defining the degree of membership in the class, "high", depending on the value of the input variable, temperature.

U.S. Pat. No. 4,852,363 discloses an air conditioner humidity control system for motor vehicles. The system measures numerous variables including vehicle speed to control humidity within the vehicle.

SUMMARY OF THE INVENTION

An object of the present invention is to provide a nonlinear method and control system for controlling an automotive HVAC system to provide improved detection and avoidance of windshield/window fogging conditions over existing methods and control systems by being able to handle imprecision naturally as a consequence of its structure and organization.

In carrying out the above object and other objects of the present invention, a method is provided for automatically controlling a heating, ventilation and air conditioning (HVAC) system of a vehicle which discharges a flow of air to a passenger cabin of the vehicle to prevent fogging of a window pane of the cabin. The system includes a variable speed blower, means for varying air temperature, ducting, actuators having various control positions for controlling the direction of air flow and the ratio of fresh air to recirculated air, a humidity sensor for sensing relative humidity within the cabin, temperature sensors for sensing temperature within the cabin and ambient temperature and an adjustable set point temperature. The method includes the step of determining a fog condition boundary based on the temperature within the cabin and the ambient temperature. The method also includes the steps of determining the difference between the relative humidity and the fog condition boundary, determining fog probability based on the difference, and defining membership functions and fuzzy rules between the fog probability and the speed of the blower and between the fog probability and the control positions of a first set of the actuators. The method also includes the step of generating control signals to control the positions of the first set of actuators and the speed of the blower to cause the system to discharge air into the cabin having a desired temperature and flow based on the fog probability, the membership functions and the fuzzy rules.

Further in carrying out the above object and other objects of the present invention, a system is provided for carrying out each of the above method steps.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
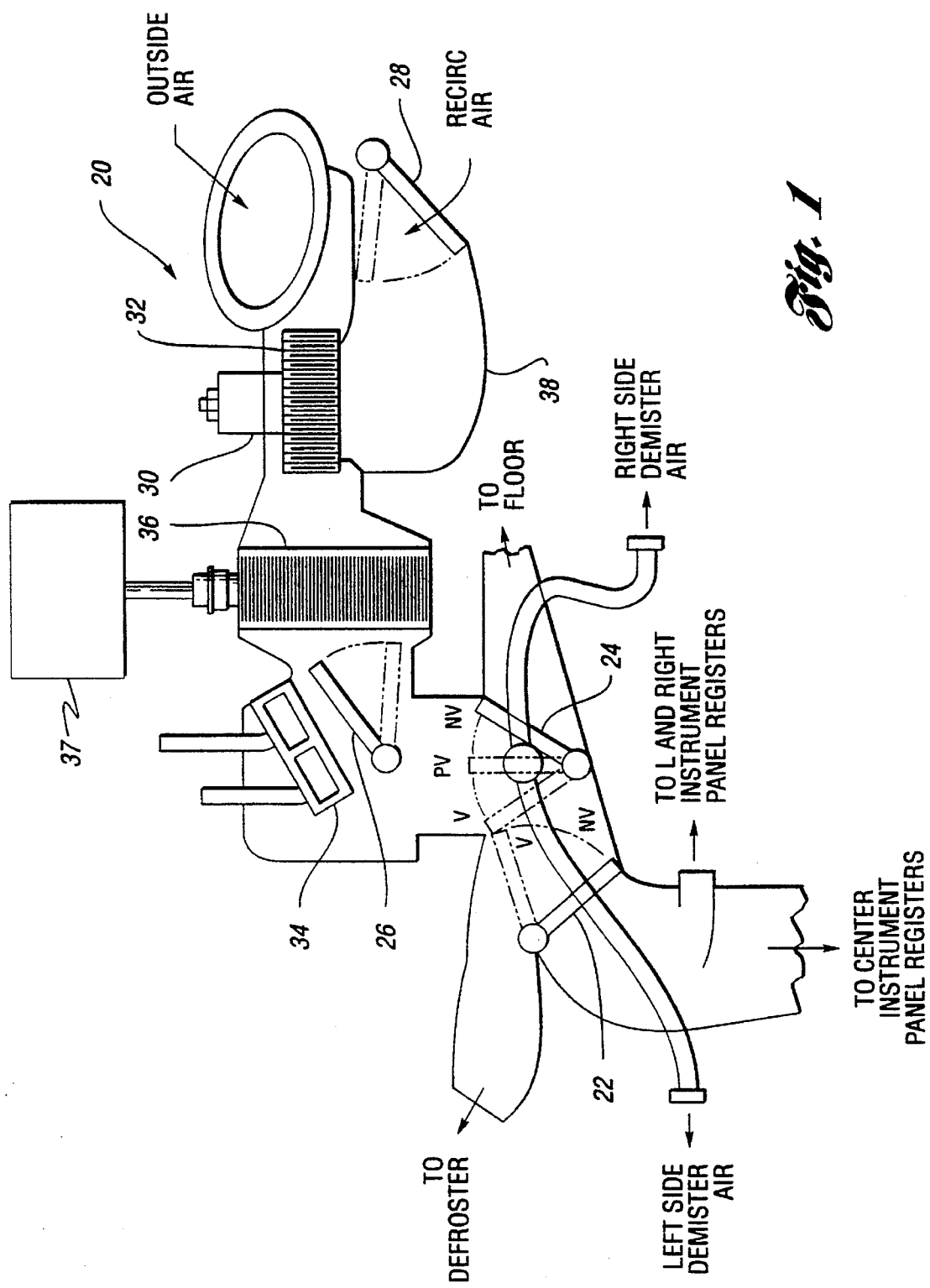
FIG. 1 is a schematic diagram illustrating an air handling system which can be controlled by the method and control system of the present invention.

In general, control of air temperature and air flow (and, to a lesser extent, humidity) within an automobile is accomplished using various actuators to affect the temperature and flow of air supplied to the cabin of the vehicle. FIG. 1 shows schematically an air handling system of an HVAC (heating, ventilation and air conditioning) system, generally indicated at 20. The system 20 includes the arrangement of panel-defrost, floor-panel, temperature blend and outside recirc air actuators or doors 22, 24, 26 and 28, respectively. The doors 22 and 24 are preferably driven by vacuum motors (not shown) between their various vacuum, partial vacuum and no vacuum positions in a conventional fashion as indicated in FIG. 1. The door 26 is driven by an electric servo motor also in a conventional fashion. The door 28 may also be driven by an electric servo motor so that the position of the door 28 is continuously variable.

The system 20 also includes a variable speed blower motor 30 including a blower wheel 32.

The system further includes heating and cooling elements such as a heater core 34 and an evaporator core 36 of a typical vehicle air conditioning plant. Each of the above components is connected via ducting 38 in order to control temperature, the direction of air flow and the ratio of fresh air to recirculated air.

For automatic control of the temperature and flow of air in the cabin, conditions within and outside the cabin are monitored by sensors and an electronic controller generates signals to control the plant actuators according to the conditions as indicated by the sensors. The evaporator temperature is controlled in a conventional automatic fashion to allow the system to dehumidify air moving thereover.

Figure 2:
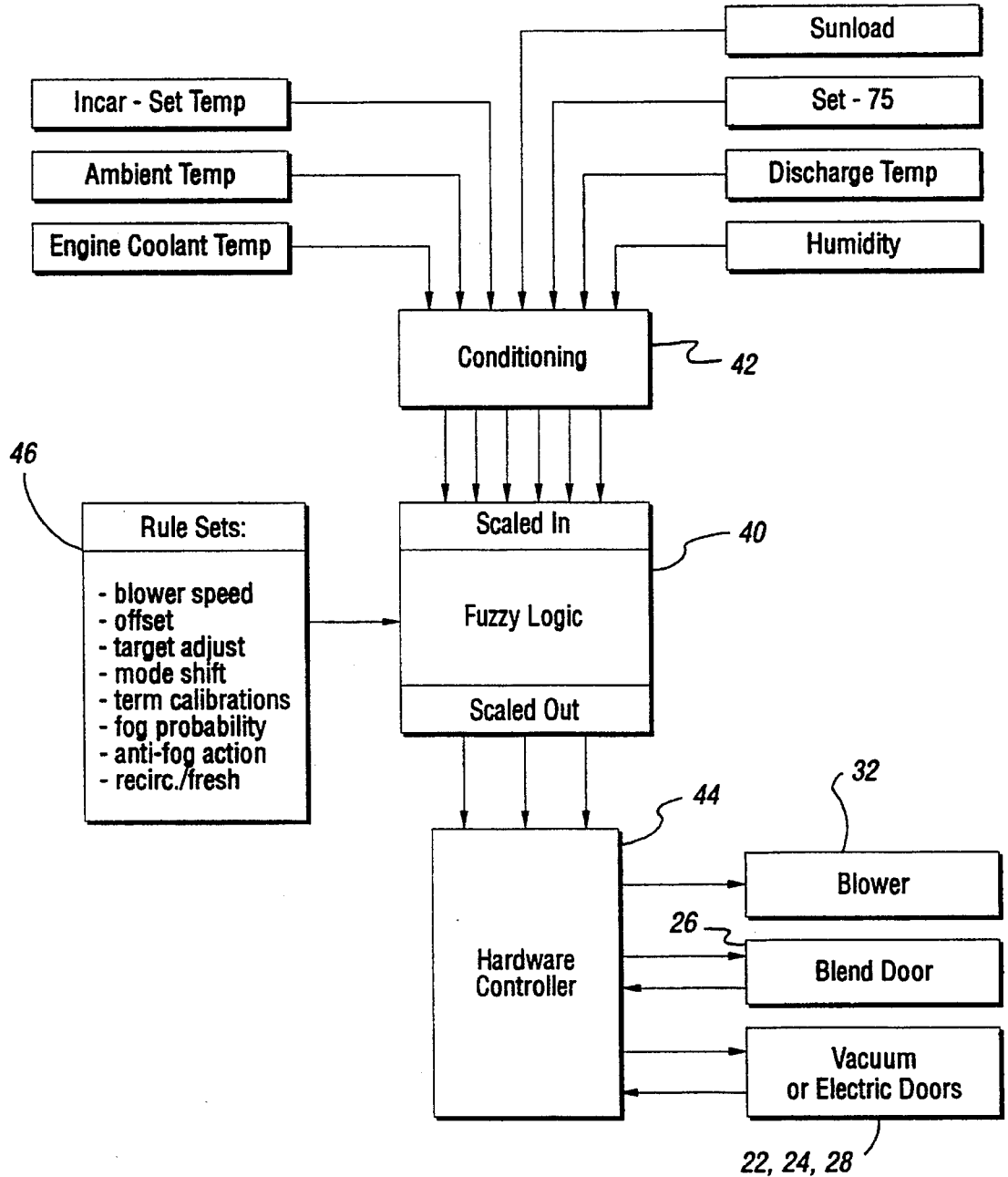
FIG. 2 is a schematic block diagram of the control system of the present invention.

As illustrated in FIG. 2, a typical complement of sensors of the HVAC system provide signals which are representative of in-car temperature, ambient (outside) air temperature, engine coolant temperature (ECT), discharge air temperature, humidity, and sunload. In addition, there is a set signal or set temperature value indicating the desired temperature that is set manually by the driver. In turn, an incar-set temperature (in-car minus set temperature) signal and a set-75 (set temperature minus 75 degrees Fahrenheit) signal are generated or calculated.

The signals are provided to an electronic controller 40 as inputs after being conditioned by a conditioning circuit 42. The controller 40 scales the input signals and provides scaled output signals for use by a hardware controller 44 which, in turn, controls the doors 22 through 28 and the blower 32 to regulate the temperature and flow of air and ultimately to prevent fogging of a window pane of a passenger cabin. Blend door position is fed back to the controller as indicated by a return arrow.

In the block diagram of the fuzzy logic system of FIG. 2, sensor inputs are conditioned, scaled, and passed to a fuzzy inference engine of the controller 40. Rule sets 46 for the various control functions—blower speed, offset, target set point, mode shift, recirculation/fresh ratio, term calibrations, etc. provide the inference engine with the details of the strategy to be performed. The fuzzy outputs are scaled and passed to the routines to control the motors, actuators, and doors that accomplish the flow and conditioning of the air supplied to the passenger compartment. The rule set basis for control organizes the strategy in a manner that allows easy calibration and adjustment of the control operation.

The fuzzy logic climate controller 40 preferably uses a Motorola 68HC11 microprocessor for its calculations. This microprocessor has 512 bytes of RAM and 12 kilobytes of ROM built in. It uses an 8 megahertz clock providing a 500 nanosecond instruction cycle time. An eight channel analog-to-digital converter is integrated into the microprocessor. Five of the eight channels are used to measure inputs that are used by the control system, namely: ambient (outside) temperature, engine coolant temperature, interior temperature, relative humidity and sunload. A further input to the system is the set point temperature which may be adjusted by the vehicle occupants using buttons on the front face of the control unit. The system outputs are: discharge air mode, intake air ratio (fresh air/recirculate), blend door position, and blower speed. The latter three outputs are continuous-valued, the former discrete. The fuzzy logic control calculation takes scaled input values and produces a single relative output value.

The controller 40 is preferably programmed primarily in C and cross-compiled into microprocessor instructions.

Each fuzzy rule set is incorporated into the fuzzy engine as a set of tables that have been previously converted into a form that allows for efficient calculation during run time. The fuzzy logic control procedure is called as part of the main loop, which is executed every 30 milliseconds. The fuzzy logic engine occupies approximately 600 bytes of ROM and uses 12 bytes of RAM during its execution. Execution time for a fuzzy calculation is typically 20 milliseconds.

The method and system of the present invention involves the combination of a humidity sensor and information processing, suitable for use by the controller 40. Humidity information from the sensor, in combination with information already available to the controller 40 (cabin temperature, ambient temperature, blower speed, etc.) allows the calculation of a degree of likelihood of windshield/window fogging.

Figure 3:
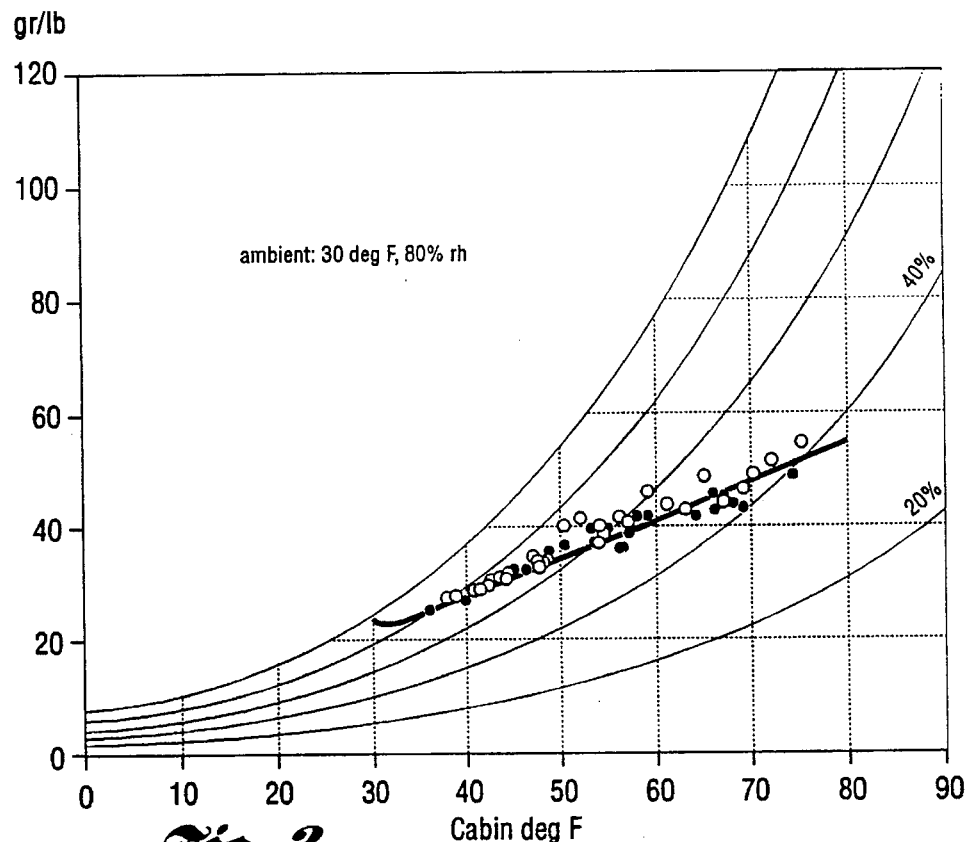
FIG. 3 is a graph illustrating a boundary of incipient fogging for a particular ambient temperature as a function of cabin temperature and humidity.

FIG. 3 shows a boundary of incipient fogging for a particular ambient temperature (30° F.) as a function of cabin temperature and cabin humidity. Open circles indicate fog for worst case conditions and closed circles indicate no fog. Below the boundary, windshield or window fogging is unlikely; just above the boundary line (the bold line), fogging will occur under worst case conditions (such as no air movement); well above the boundary, fogging will prevail except for those portions of the windshield where air movement is high.

Figure 4:
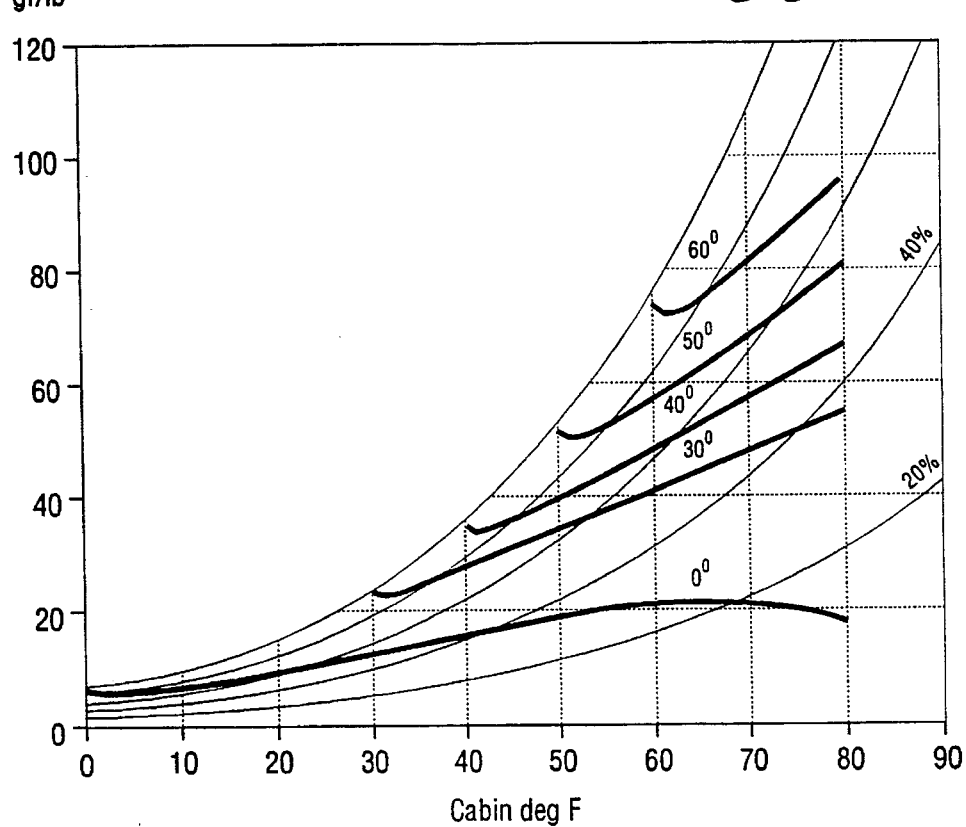
FIG. 4 is a graph illustrating a number of such boundaries for a number of ambient temperatures.
Figure 8:
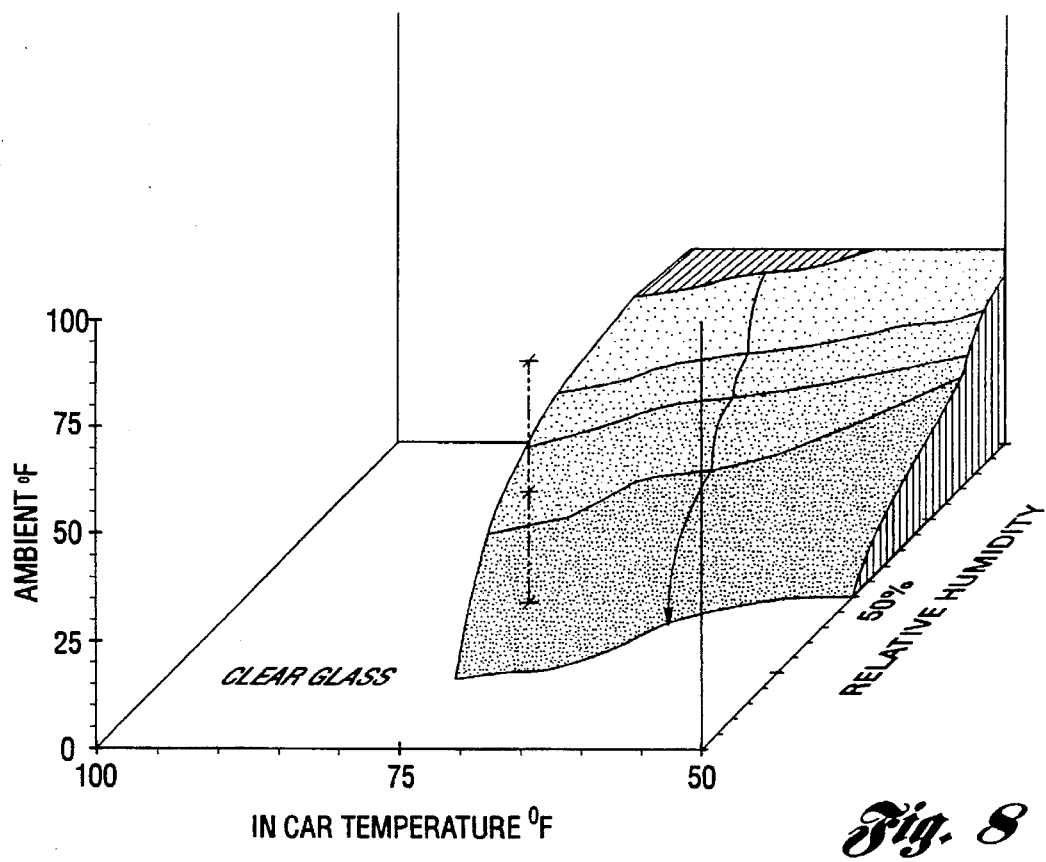
FIG. 8 is a 3-D graph illustrating fogging probability using the inputs of cabin temperature, humidity, and ambient temperature.

FIG. 4 shows a number of such boundaries for various ambient temperatures. FIG. 8 is a 3-D graph illustrating where fogging is likely using the inputs of cabin temperature, humidity and ambient temperature. In FIG. 8, anything in the volume shown represents a high degree of fog probability.

Figure 5:
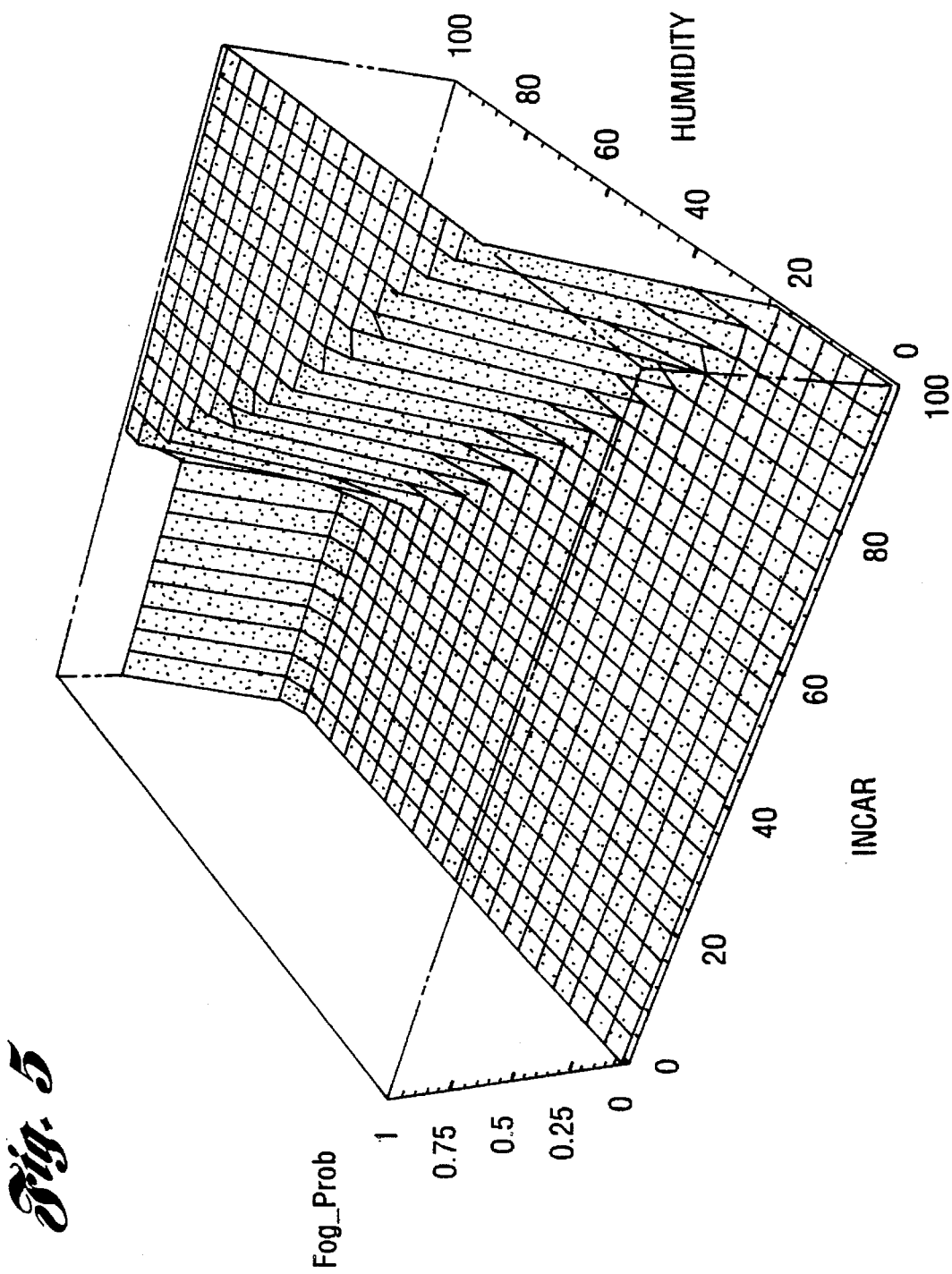
FIG. 5 is a 3-D graph illustrating fuzzy mapping of fogging probability using the inputs of cabin temperature and humidity at a constant ambient temperature.

Given the availability of humidity information, the mapping of the boundary may be performed by any of a number of calculations. Fuzzy logic is one such method. FIG. 5 shows the fuzzy mapping of fog or fogging probability using the inputs: cabin temperature and cabin humidity at a constant ambient temperature of 40°.

The incipient fog boundary is specified as a function of relevant variables:

$$BD\_Hum = fn(INCAR, AMB)$$

For example, a simple such function would be:

$$BD\_Hum = 100 - 0.45*(INCAR - AMB) - 5.5* \sqrt{(INCAR - AMB)}$$

The difference between measured cabin humidity and incipient fog humidity is used as an input variable for fuzzy mapping:

$$BD\ Diff = Humidity - BD\_Hum$$

Figure 6A:
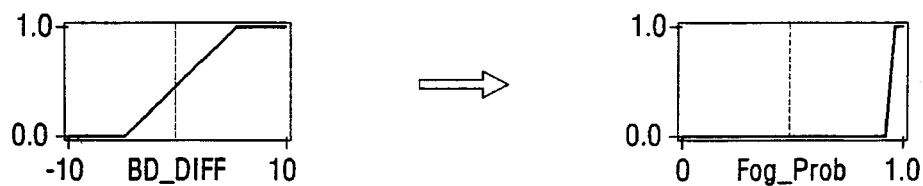
FIGS. 6a and 6b are graphical illustrations of a fogging probability rule set including antecedent and corresponding consequent membership functions.
Figure 6B:
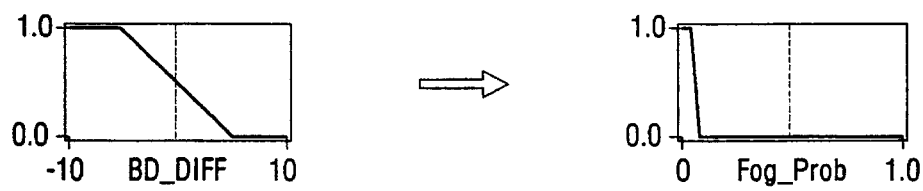

This variable may be used with a simple set of rule membership functions to define the sharpness of the boundary in FIG. 5 as follows and as illustrated graphically in FIGS. 6a and 6b:

Rule 1: IF Hum−BD_Hum is HIGH, THEN Fog_Prob is HIGH

Rule 2: IF Hum−BD_Hum is LOW, THEN Fog_Prob is LOW

Given the ability to detect incipient fog conditions, it is appropriate to state a strategy for avoiding these conditions. One approach might be to incorporate in an all-inclusive strategy instructions so that fog conditions would never occur. A fog-avoidance-at-all-costs approach has some definite liabilities. First, in order to assure that fog conditions never occur, the strategy would invariably suffer in terms of other important considerations such as comfort and economy. Consequently, the anti-fog measures are preferably implemented only under those limited conditions where fog may occur. Secondly, complete assurance of control in every situation an automobile climate control system encounters is not possible: there are too many variables not under control. One may not be able to determine always when fogging conditions pertain.

Figure 7:
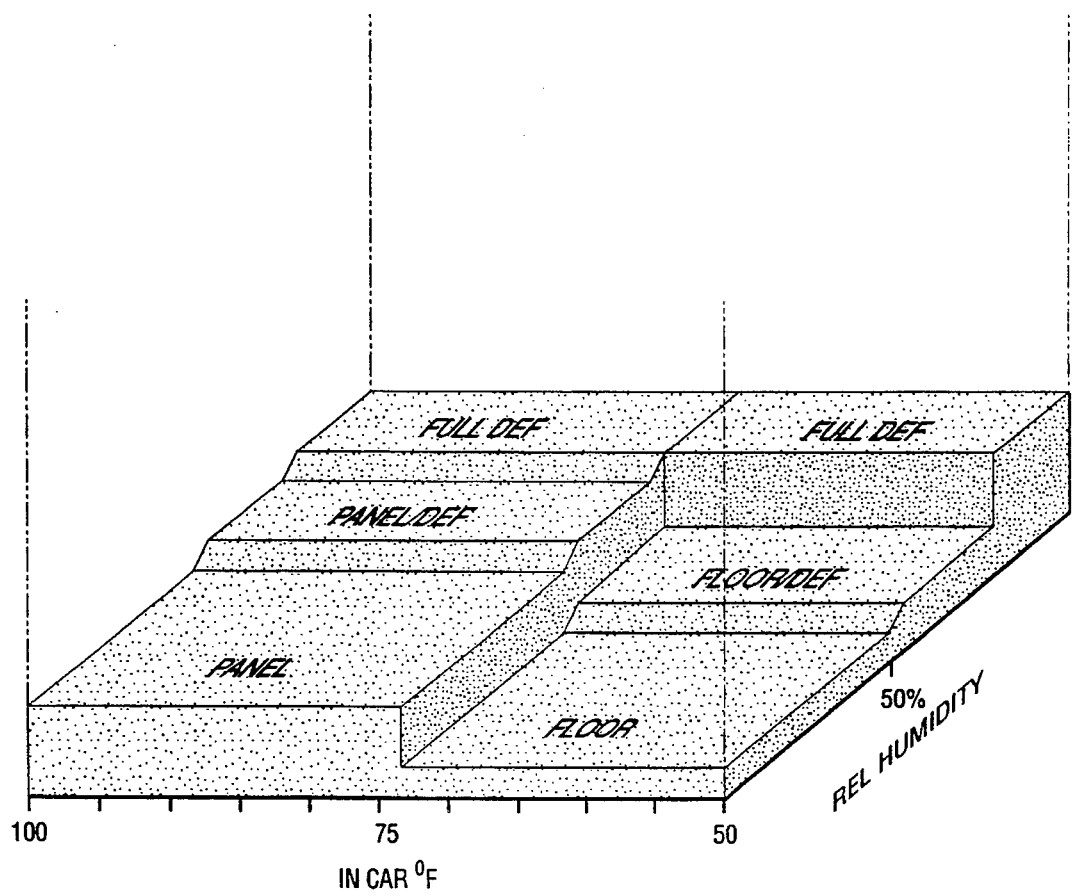
FIG. 7 is a graphical response surface resulting from the mode shift rule sets of the present invention.
Figure 9:
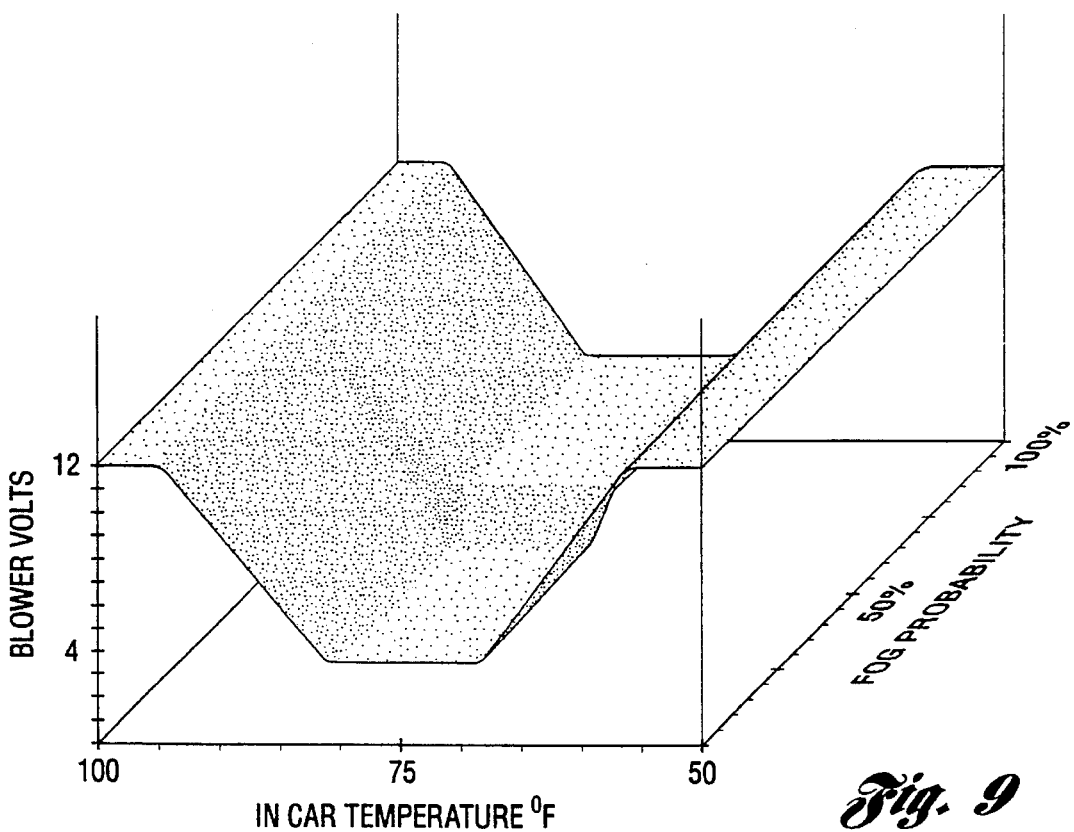
FIG. 9 is a 3-D graph illustrating a blower strategy using the inputs of blower volts, cabin temperature and fog probability.

The strategy for anti-fog is a complete, standard fuzzy strategy, with the addition of the following rules:

| IF Humidity is HIGH, | THEN Recirc is LOW |
|---|---|
| IF Humidity is HIGH, | THEN Blower is MEDIUM |
| IF Fog_Prob is HIGH, | THEN Recirc is ZERO |
| IF Fog_Prob is HIGH, | THEN Blower is HIGH |
| IF Fog_Prob is HIGH, | THEN Target is HIGH |
| IF Fog_Prob is HIGH, | THEN Mode is DEFROST |
| IF Fog_Prob is MED, | AND Incar is WARM THEN Mode is PNL/DEF |
| IF Fog_Prob is MED, | AND Incar is COOL THEN Mode is FLR/DEF | where Humidity is the measured relative humidity, Fog_Prob is the measure of likelihood of windshield fogging, Recirc is air recirculation door position, Blower is blower speed, Mode is air ducting mode, and Target is the result of an adjustment to the set point temperature. FIG. 7 shows a mapping of modes for the anti-fog strategy. FIG. 9 shows a mapping of blower voltage for the anti-fog strategy.

The use of the present invention in climate control systems strategy results in improved detection and avoidance of incipient windshield/window fog conditions. The ability to tailor gradual, nonlinear response has allowed the design of the strategy to address certain situations that have not been handled properly in the past.

New vehicle programs and the requirements of simultaneous engineering are reducing the time available to develop new automatic climate control strategies. Consequently, the control strategy should be developed at the same time that the HVAC system is being designed. The organization and flexibility of the present invention allow one to develop a set of base rules even before the characteristics of a HVAC system have been finalized.

While the best mode for carrying out the invention has been described in detail, those familiar with the art to which this invention relates will recognize various alternative designs and embodiments for practicing the invention as defined by the following claims.

What is claimed is:

1. A method for automatically controlling a heating, ventilation and air conditioning (HVAC) system of a vehicle which discharges a flow of air to a passenger cabin of the vehicle to prevent fogging of a window pane of the cabin, the system including a variable speed blower, means for varying air temperature, ducting, actuators having various control positions for controlling the direction of air flow and the ratio of fresh air to recirculated air, a humidity sensor for sensing relative humidity within the cabin and temperature sensors for sensing temperature within the cabin and ambient temperature and an adjustable set point temperature, the method comprising the steps of:

determining a fog condition boundary based on temperature within the cabin and ambient temperature;

determining a difference between relative humidity and the fog condition boundary;

determining a fog probability based on the difference;

defining membership functions and fuzzy rules between the fog probability and the speed of the blower and between the fog probability and the control positions of a first set of the actuators; and generating control signals to control the positions of the first set of actuators and the speed of the blower to cause the system to discharge air into the cabin having a desired temperature and flow based on the fog probability, the membership functions and the fuzzy rules to prevent fogging of the window pane.

2. The method as claimed in claim 1 further comprising the step of defining membership functions and fuzzy rules between the relative humidity and the control positions of the actuators and wherein the step of generating is also based on the relative humidity.

3. The method as claimed in claim 1 further comprising the step of defining membership functions and fuzzy rules between the relative humidity and the speed of the blower, and wherein the step of generating is also based on the relative humidity.

4. The method as claimed in claim 1 further comprising the step of defining membership functions and fuzzy rules between the fog probability and an adjustable target temperature wherein air temperature is controlled.

5. The method as claimed in claim 1 further comprising the step of defining membership functions and fuzzy rules between the temperature within the cabin and the control positions of the actuators and wherein the step of generating is also based on the temperature within the cabin.

6. A control system for automatically controlling a heating, ventilation and air conditioning (HVAC) system of a vehicle which discharges a flow of air to a passenger cabin of the vehicle to prevent fogging of a window pane of the cabin, the HVAC system including a variable speed blower, means for varying air temperature, ducting, actuators having various control positions for controlling the direction of air flow and the ratio of fresh air to recirculated air, a humidity sensor for sensing relative humidity within the cabin and temperature sensors for sensing temperature within the cabin and ambient temperature and an adjustable set point temperature, the system comprising:

means for determining a fog condition boundary based on temperature within the cabin and ambient temperature;

means for determining a difference between relative humidity and the fog condition boundary;

means for determining a fog probability based on the difference;

means for defining membership functions and fuzzy rules between the fog probability and the speed of the blower and between the fog probability and the control positions of a first set of the actuators; and means for generating control signals to control the positions of the first set of actuators and the speed of the blower to cause the HVAC system to discharge air into the cabin having a desired temperature and flow based on the fog probability, the membership functions and the fuzzy rules to prevent fogging of the window pane.

7. The system as claimed in claim 6 further comprising means for defining membership functions and fuzzy rules between the temperature within the cabin and the control positions of the actuators and wherein the means for generating generates the control signals also based on the temperature within the cabin.

8. The system as claimed in claim 6 further comprising means for defining membership functions and fuzzy rules between the relative humidity and the control positions of the actuators and wherein the means for generating generates the control signals also based on the relative humidity.

9. The system of claim 6 further comprising means for defining membership functions and fuzzy rules between the fog probability and an adjustable target temperature wherein air temperature is controlled.

10. The system of claim 6 further comprising means for defining membership functions and fuzzy rules between the relative humidity and the speed of the blower and wherein the means for generating generates the control signals also based on the relative humidity.

\* \* \* \* \*